Nov. 3, 1970 G. H. DIMOND 3,537,231

BOTTLE CAPPER

Filed June 12, 1968 12 Sheets-Sheet 1

INVENTOR.
George H. Dimond
BY
Howard R. Goldberg
ATTORNEY.

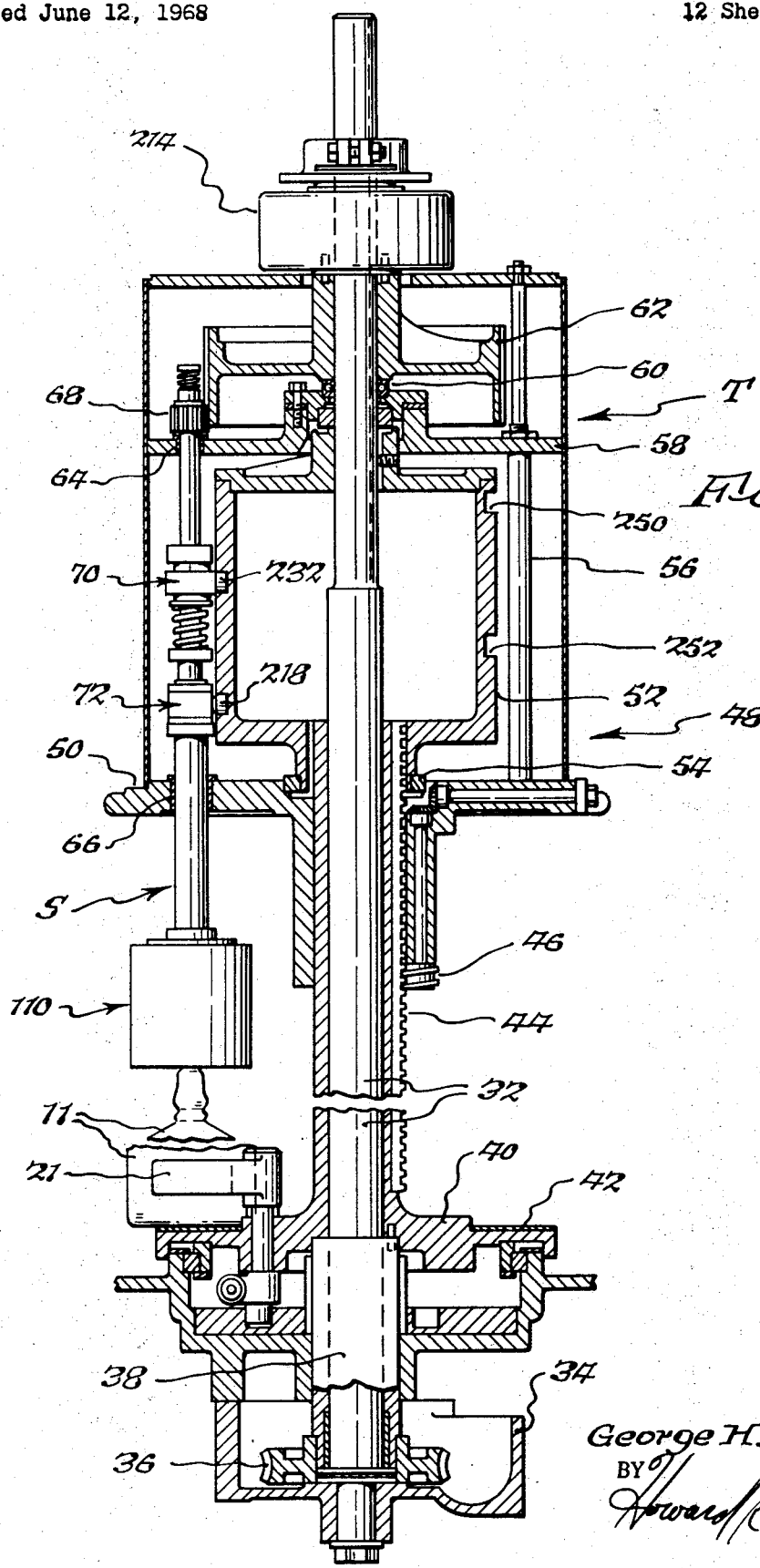

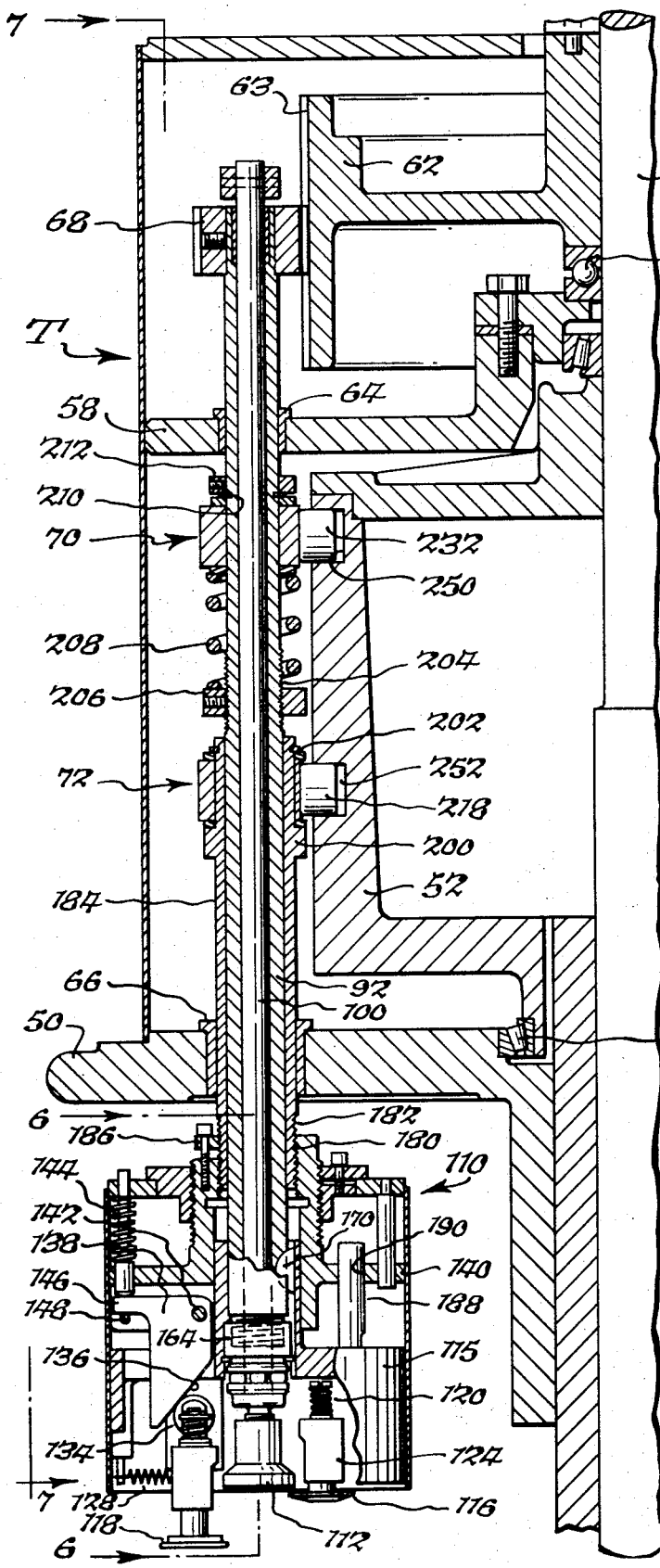

Nov. 3, 1970    G. H. DIMOND    3,537,231
BOTTLE CAPPER
Filed June 12, 1968    12 Sheets-Sheet 4

INVENTOR.
George H. Dimond
BY
Howard Goldberg
ATTORNEY.

Nov. 3, 1970 G. H. DIMOND 3,537,231
BOTTLE CAPPER
Filed June 12, 1968 12 Sheets-Sheet 5
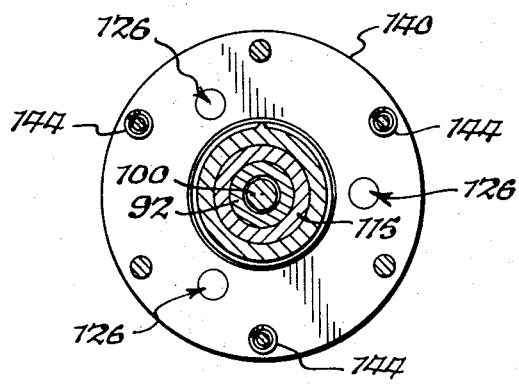
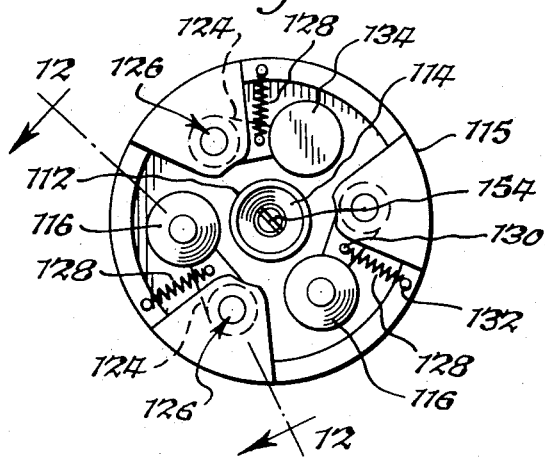
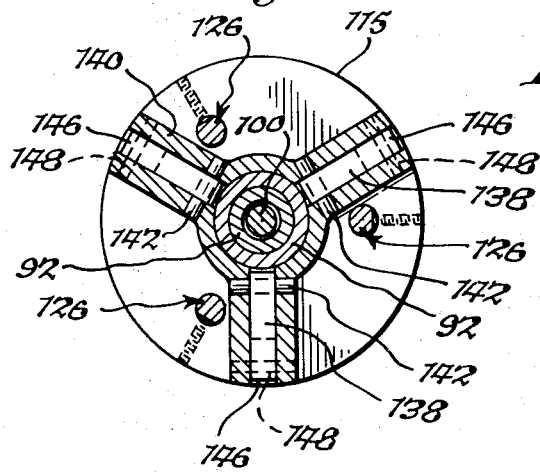
INVENTOR.
George H. Dimond
BY
Howard Goldberg
ATTORNEY.

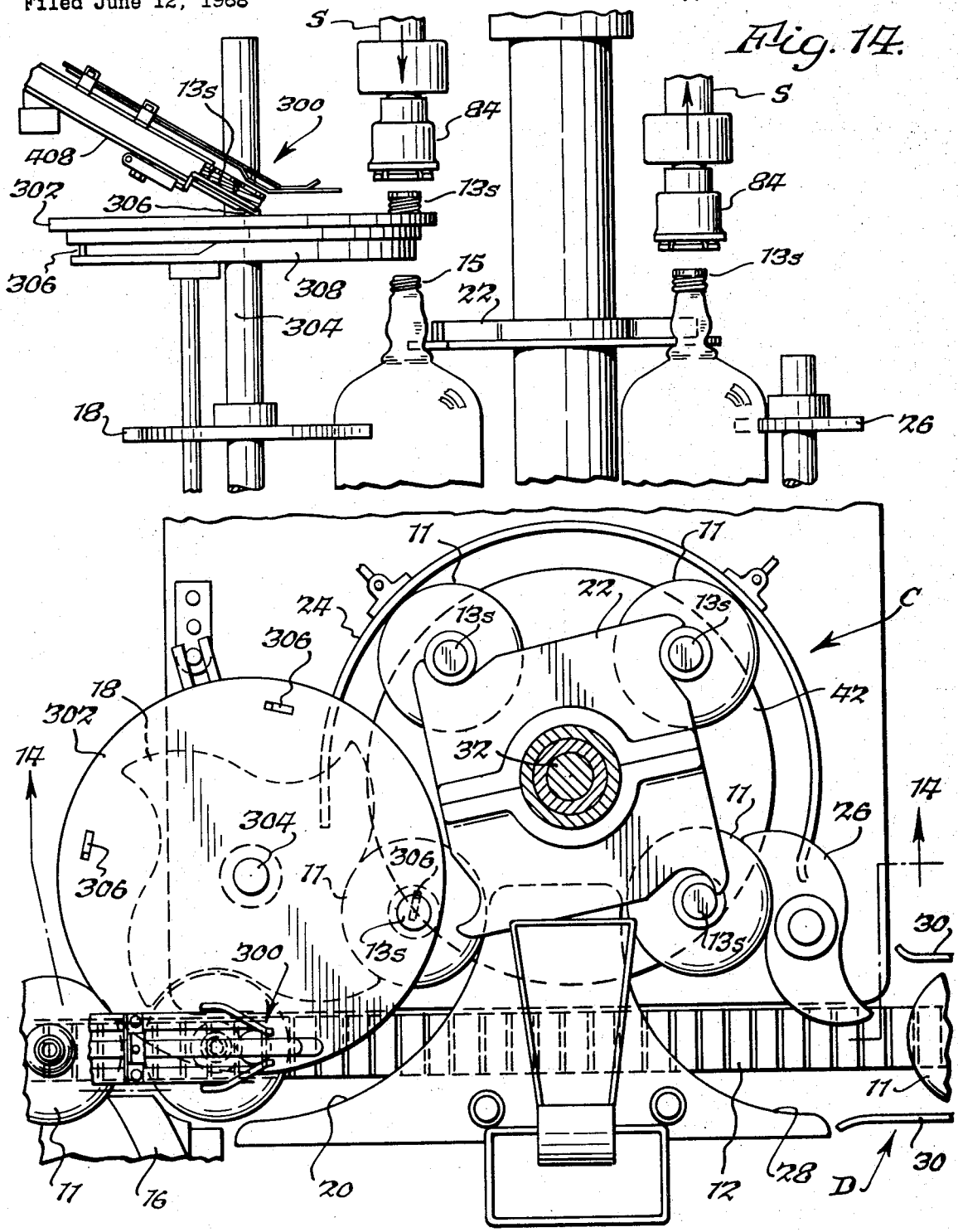

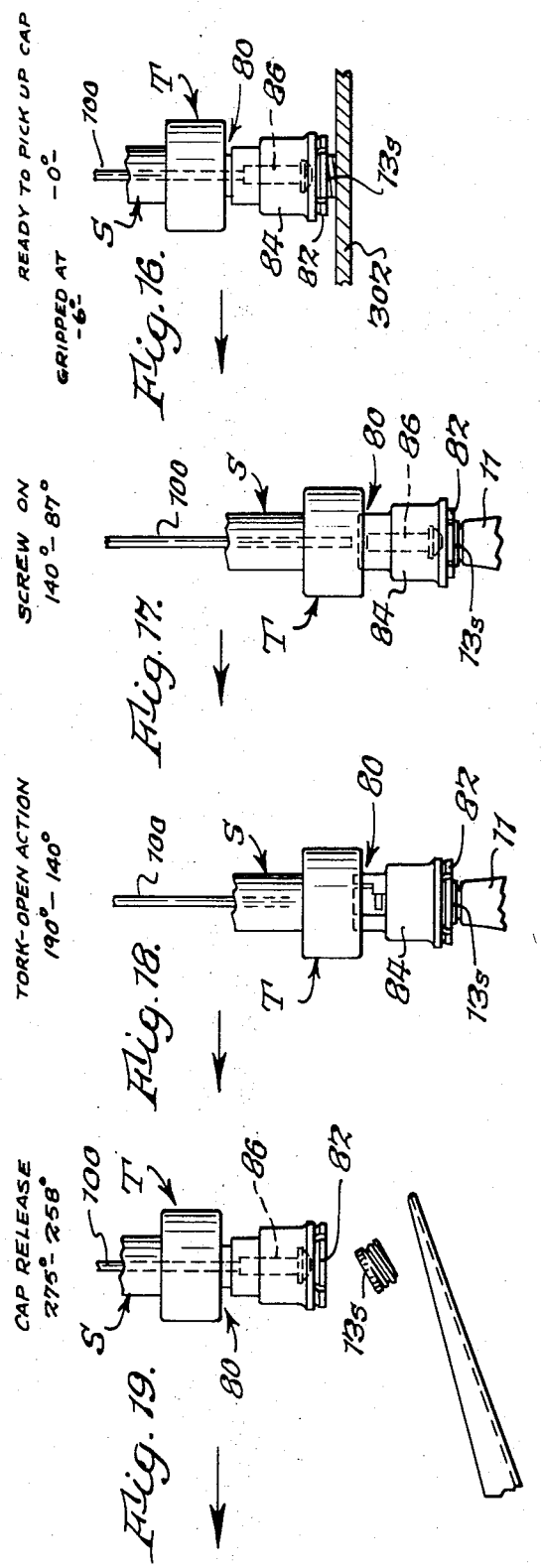
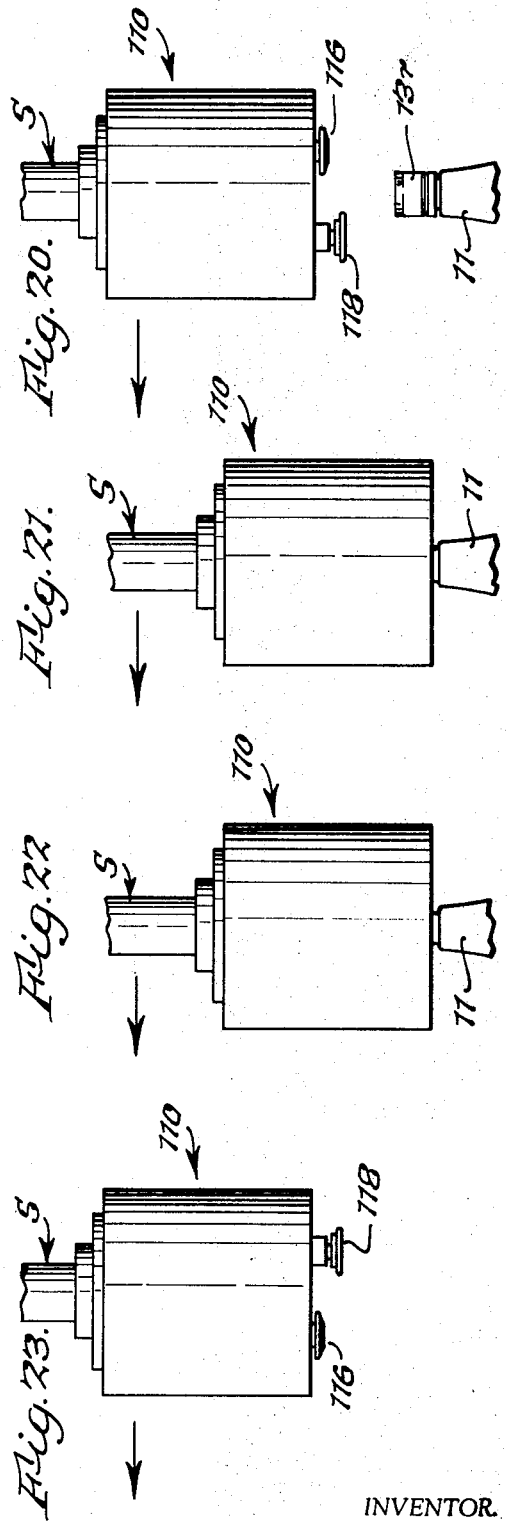

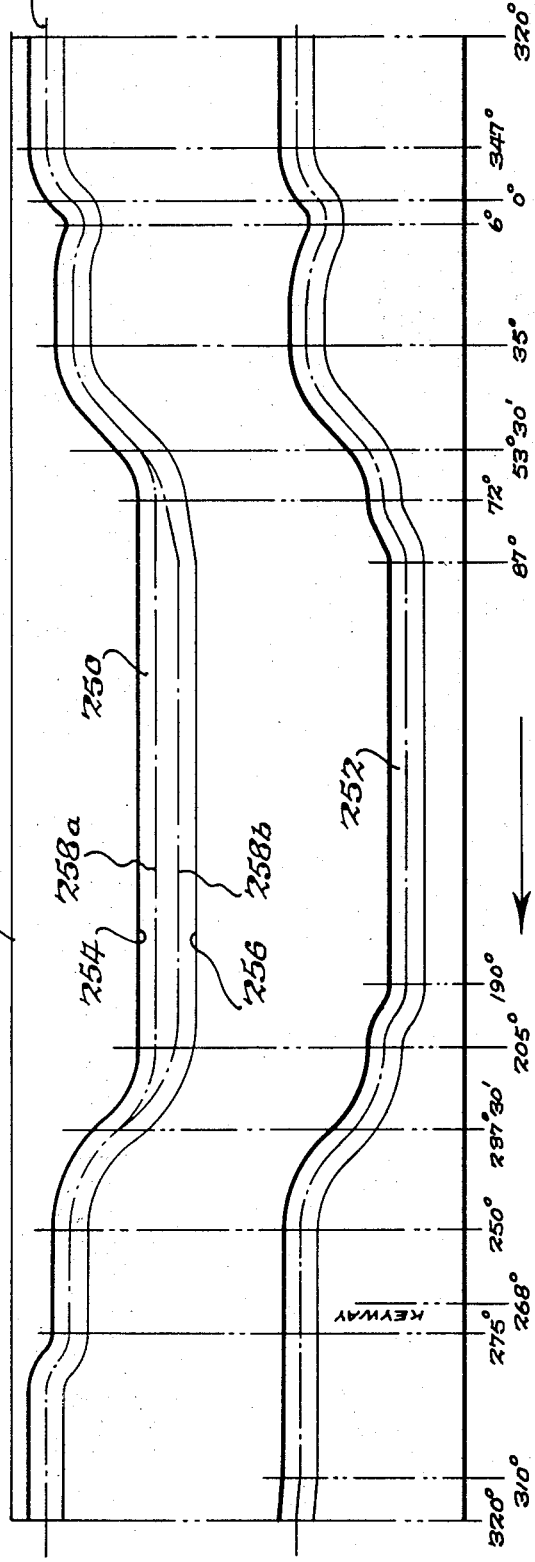

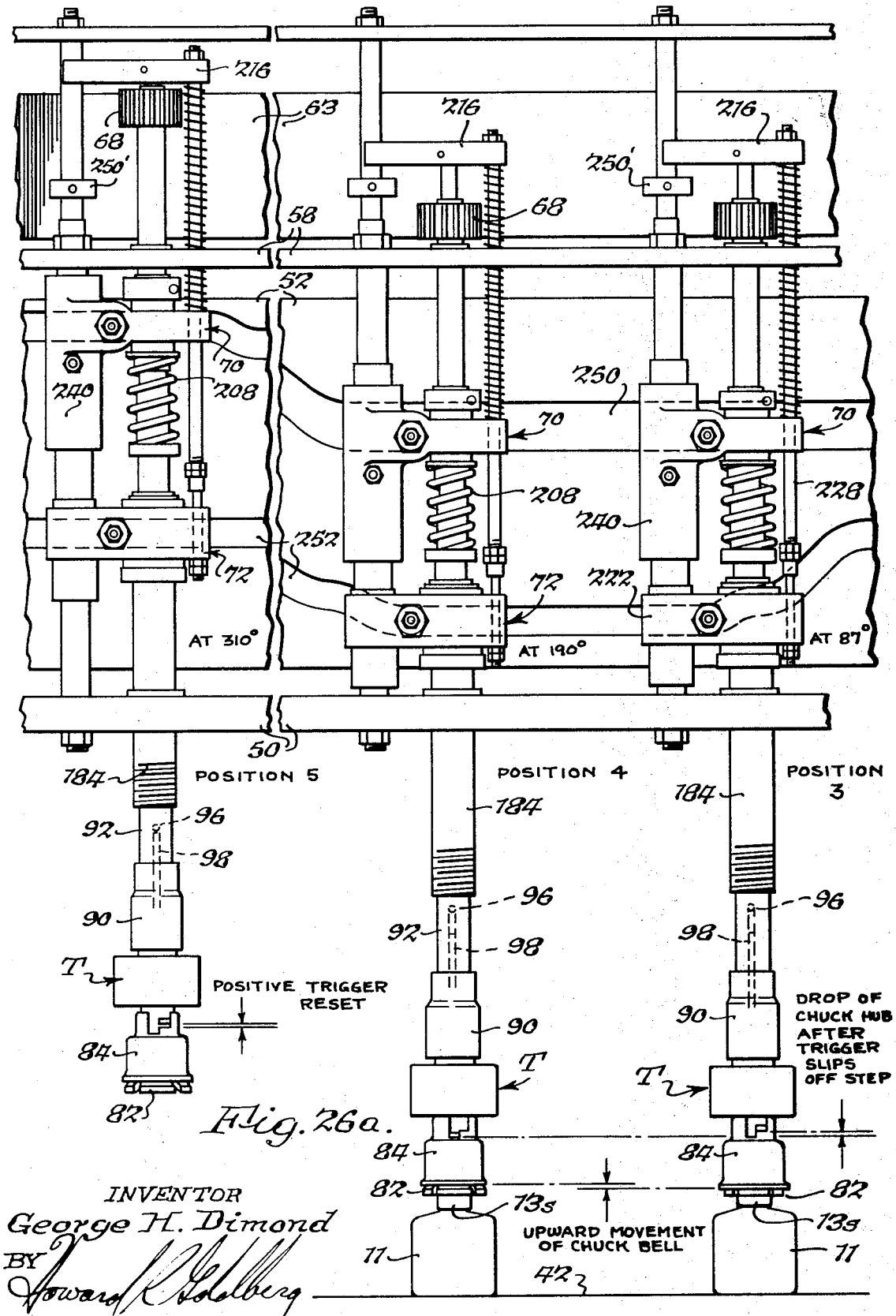

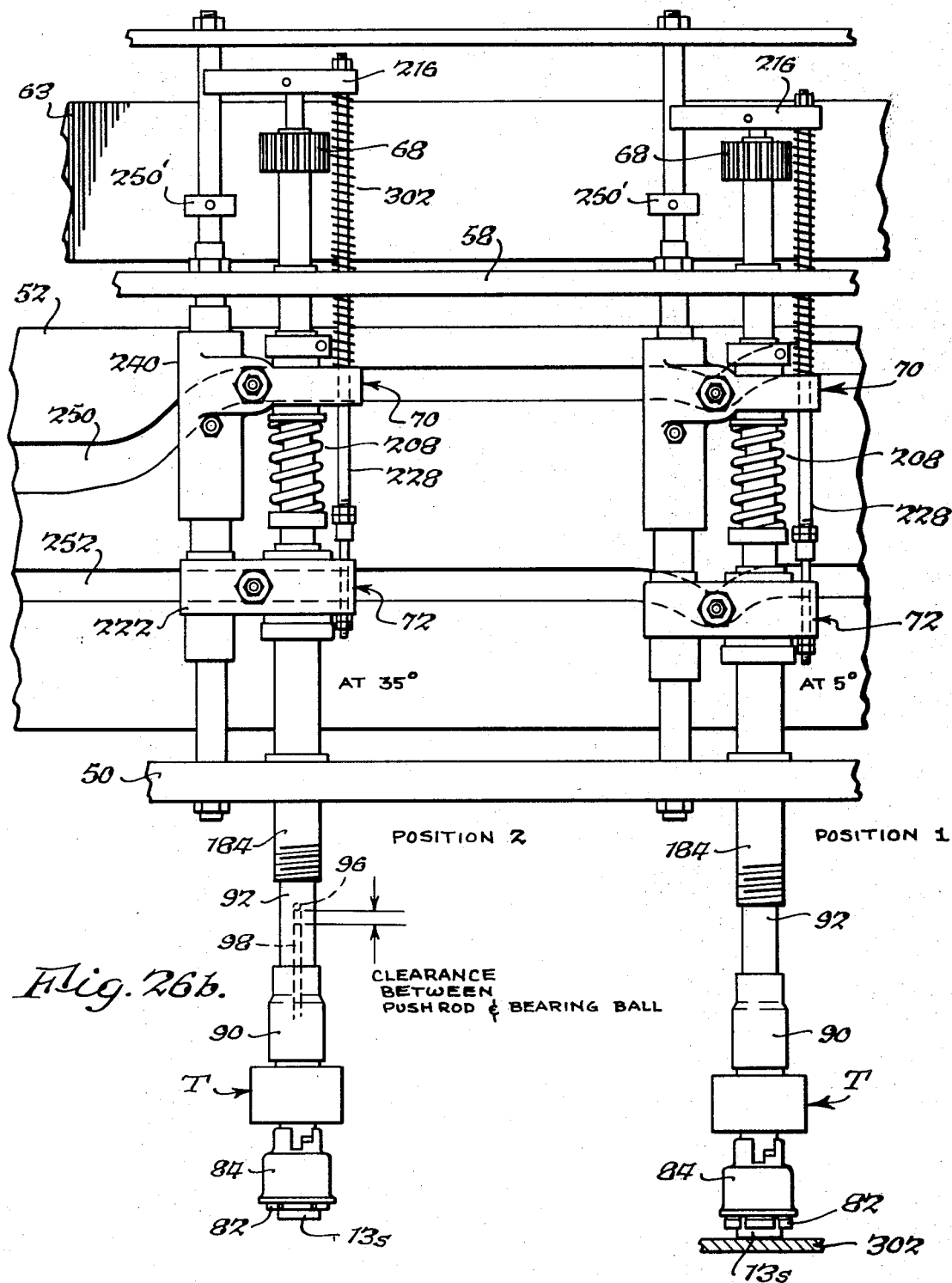

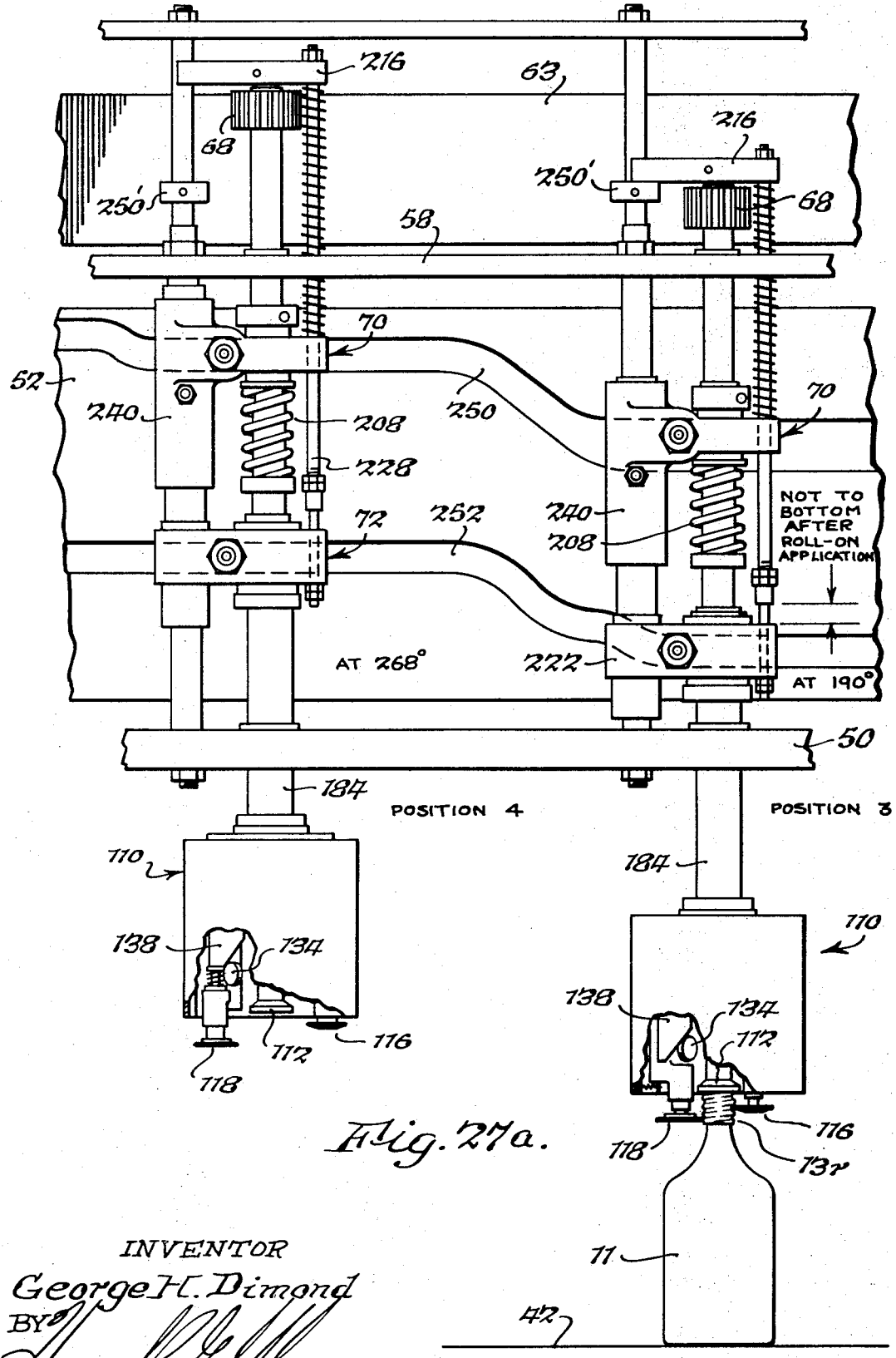

Nov. 3, 1970     G. H. DIMOND     3,537,231
BOTTLE CAPPER
Filed June 12, 1968     12 Sheets-Sheet 12
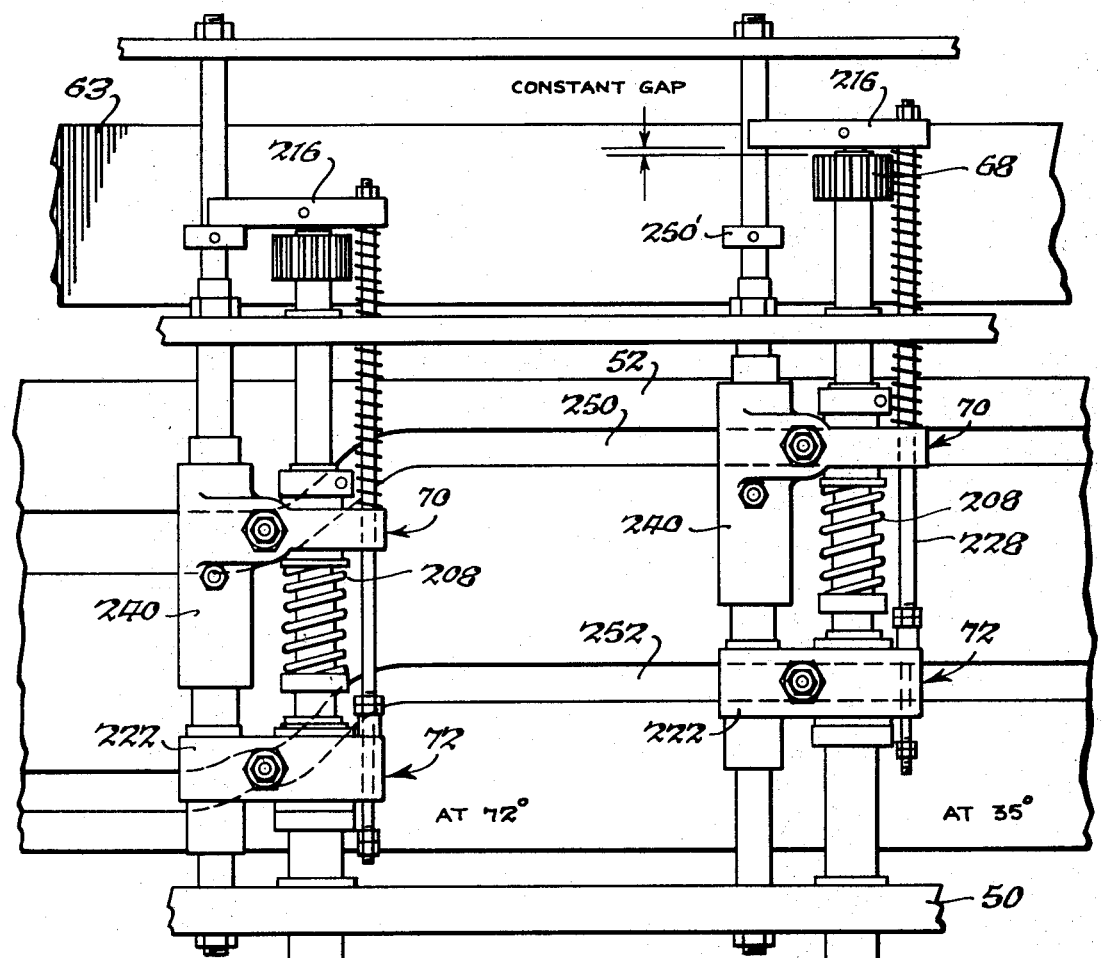
Fig. 27b.
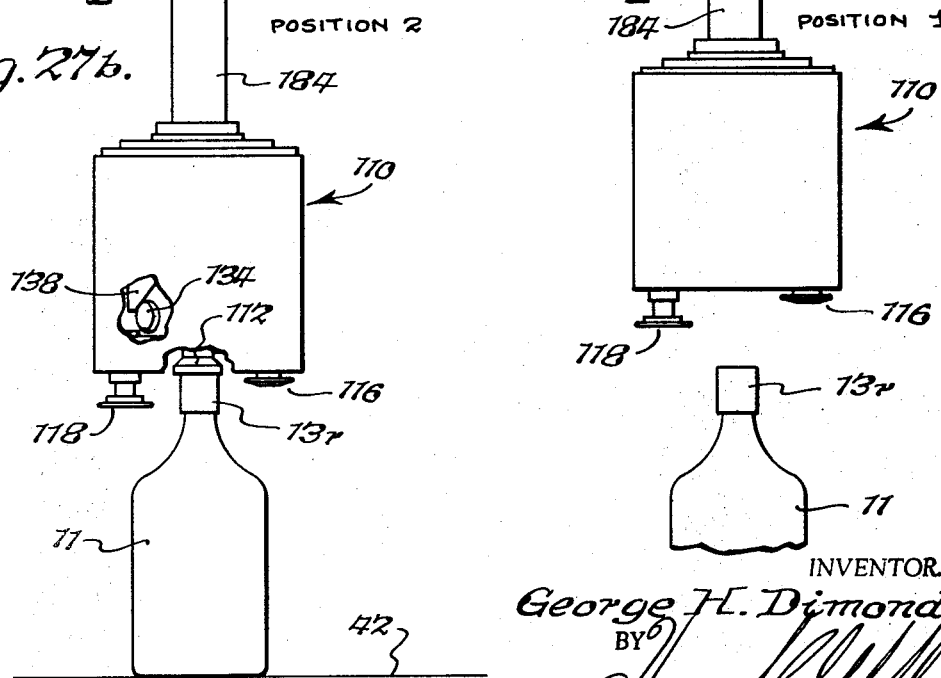
INVENTOR.
George H. Dimond
BY
Howard Goldberg
ATTORNEY.

United States Patent Office 3,537,231
Patented Nov. 3, 1970

3,537,231
BOTTLE CAPPER
George H. Dimond, East Aurora, N.Y., assignor to Consolidated Packaging Machinery Corporation, New York, N.Y., a corporation of New York
Filed June 12, 1968, Ser. No. 736,318
Int. Cl. B65b 7/28
U.S. Cl. 53—201                1 Claim

ABSTRACT OF THE DISCLOSURE

A turret type container capper for selectively applying both screw-on and roll-on caps to containers having a spindle, comprising three coaxial spindle elements, one of which is rotated about its axis by a gear mounted thereon and is turned by engagement with a stationary gear about which the spindle orbits and two cam followers, one of which provides axial movement to the rotated spindle element and the other of which provides axial movement to one of the other spindle elements and selectively provides axial movement to the third, the cam followers being activated by a stationary cam about which the spindle orbits, the coaxial spindle elements being adapted to selectively mount and operate both screw-on and roll-on chucks without machine adjustment.

The instant invention relates generally to improvements made in machines adapted to apply closure caps to container discharge openings. More particularly the invention relates to improvements enabling one capping machine to apply both roll-on and screw-on caps. Screw-on caps are common prethreaded caps while roll-on caps have their retaining portions formed by a roll type die acting cooperatively with retention means provided on the container to displace the material of their skirts into cooperative engagement with the retention means. Roll-on caps are normally made of a soft displaceable material such as aluminum. Since the cap is softer than the container (normally glass) the die acting on the cap against the container will upset the aluminum skirt of the cap into conformation with the retention means on the container discharge opening. Both of the machine operations (screw-on and roll-on capping) are conventional and are carried out on conventional single purpose machines with conventional capping chucks. A single purpose machine designed for use with a screw-on chuck, for example, will not accept or operate a roll-on chuck and vice versa without extensive rebuilding. With the instant invention it is possible to selectively do both screw-on and roll-on capping using conventional screw-on and roll-on chucks on the same machine by merely mounting the desired chuck on the machine spindle.

Thus, a packager can carry out a full range of capping operations on one machine. This is significant in view of the high cost of the capping machines and the fact that it may be very difficult to anticipate the balance which will occur between screw-on and roll-on capping orders. Without the instant invention the packager must have enough of each type of capper (screw-on and roll-on) to accommodate a varying balance of orders which may alternatively be heavily weighted toward roll-on capping or screw-on capping. Furthermore, since many of the basic components of the instant invention are similar in type to the basic components of single purpose machines such as bases, feeds, drives, gears, cams, etc., and since the instant invention does not require a greater number of these basic components than a single purpose machine, the cost of the dual purpose machine of the instant invention need not necessarily be significantly greater than the cost of the single purpose machine. The favorable comparative cost of the instant invention coupled with the fact that it need not be idled by an imbalance of capping orders, make for considerable economic benefits. Also, since a capping machine with its associated container feed and discharge stations requires considerable floor space, with the associated cost therof, there is an unquestionable need for a capping machine which need not be idled by order imbalances. To this end, a dual purpose capping machine has been developed which is the subject of the instant invention. Although the concepts of this invention are equally applicable to a single spindle capper, the preferred embodiment which will be hereinafter described is a multispindle turret type capping machine wherein containers are fed sequentially into a capping station where they are held stationary with respect to capping spindles which can selectively apply both screw-on and roll-on caps depending upon which type of chuck is mounted on the spindles. It should be noted that while it is considered desirable to hold the container still with respect to the spindle and revolve certain of the spindle elements, a machine which revolved the container and the spindle elements which must remain stationary with respect to the container while restraining the normally revolving spindle elements against rotation about their axis, could be built using the concepts of the instant invention.

It is therefore one object of the instant invention to economically provide a capper which can selectively carry out both roll-on and screw-on capping functions with conventional roll-on and the screw-on chucks by merely changing the chuck which is mounted on the spindle from one chuck to the other without the necessity of adjusting the machine turret.

The present invention as well as further objects and features thereof, will be understood more clearly and fully from the following detailed description of a preferred embodiment, when read in conjunction with the accompanying drawings, in which:

FIG. 4 is a fragmentary side view, partly in section, of the embodiment of FIG. 1 wherein the spindle has a roll-on chuck mounted thereon.

FIG. 5 is a more detailed fragmentary elevation, partially in section and partially broken away, of the embodiment of FIG. 4.

FIG. 6 is a detailed sectional fragment of the embodiment of FIG. 4.

Figure 7:
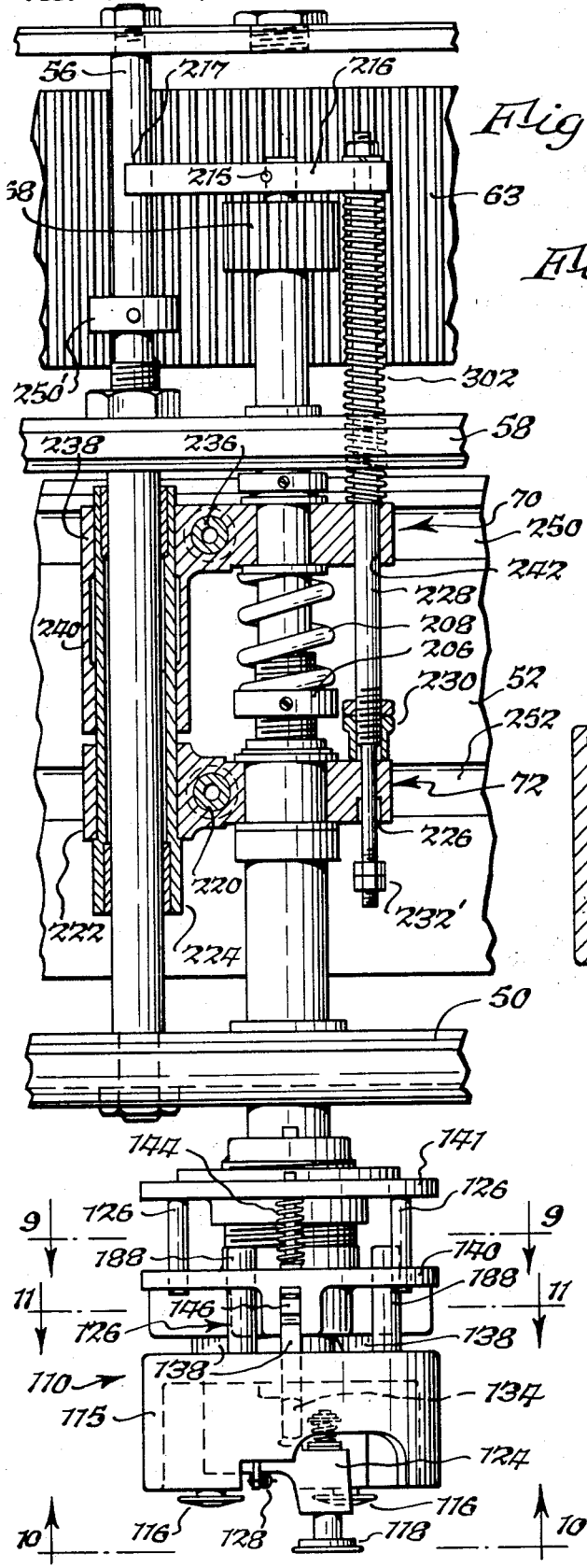
FIG. 7 is a fragmentary sectional front elevation of the embodiment of FIG. 4 showing portions which are hidden in FIG. 4.

FIGS. 9, 10 and 11 are cross sections of the roll-on chuck taken respectively at planes 9, 10 and 11 in FIG. 7.

FIG. 12 is a fragmentary cutaway view of the die roller of the roll-on chuck.

FIG. 13 is a fragmentary elevation of the spindle of the instant invention mounting the screw-on chuck and a portion of the roll-on chuck.

FIG. 14 is a fragmentary elevation of the instant invention showing the screw-on cap feeding mechanism and its relation to the spindle of the instant invention.

FIG. 15 is a plan view of the container feed mechanism of the instant invention.

FIGS. 16, 17, 18 and 19 show the screw-on chuck in various stages of its operation.

FIGS. 20, 21, 22 and 23 show the roll-on chuck at the same stages of operation as FIGS. 20, 21, 22 and 23, respectively.

FIG. 24 shows the cylindrical cam tracks of the instant invention laid out in a single plane.

FIG. 25 illustrates the relative displacement of the cam followers of the instant invention with respect to each other during a segment of their operation.

FIG. 26 illustrates the various operations of the instant invention when carrying out a roll-on operation.

FIG. 27 illustrates the various operations of the instant invention when carrying out a screw-on operation.

The instant invention constitutes improvements made in turret cappers to provide a machine of this type which is readily adaptable to the application of screw-on caps and roll-on caps. Screw-on caps are common prethreaded caps while roll-on caps have their retaining portions formed by a roll type die acting in cooperation with the retention means already provided on the container. Since a large portion of the machine is conventional and well-known to those skilled in the capping art, it will be generally described hereafter only to the extent necessary to provide the structural background necessary to define the improvements of the instant invention.

BASIC TURRET CAPPER MACHINE

Figure 1:
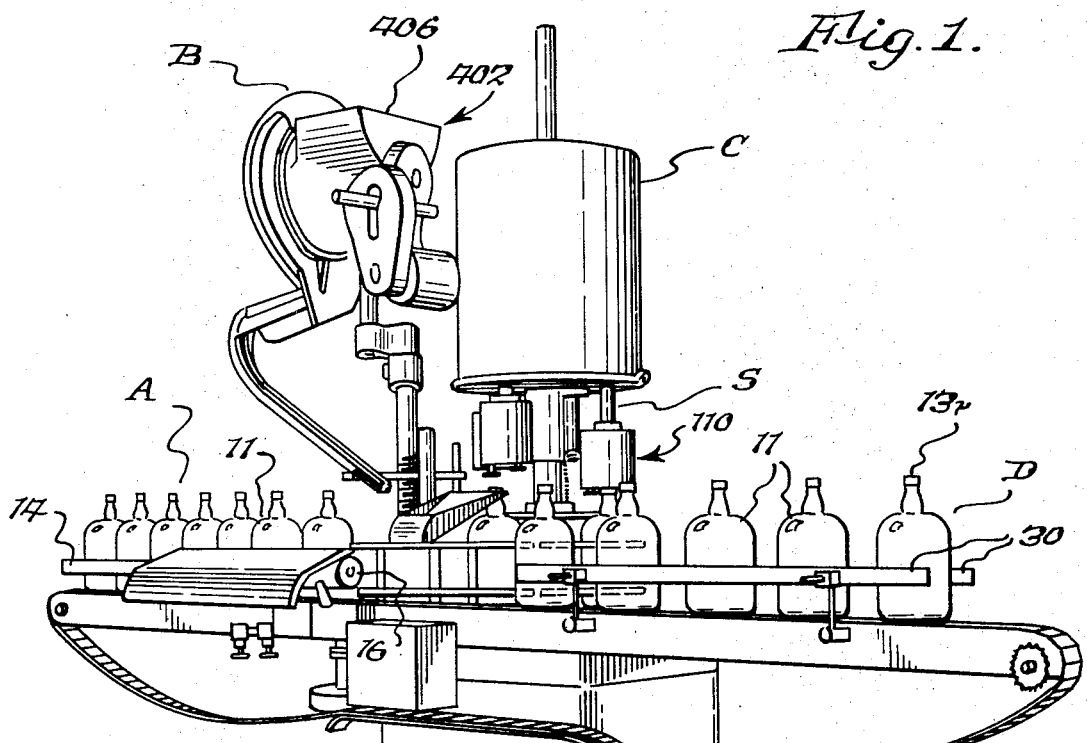
FIG. 1 is an overall view of the preferred embodiment of the instant invention.

Turret type capping machine 10 (FIG. 1) comprises a container feed belt 12, which moves containers 11 from the input station generally indicated at A, under cap feeding station B and into capping station C where the containers are capped. The containers 11 are removed from the capping station and replaced on belt 12 which carries them to the discharge station D.

Input station A comprises an input chute 14 and a helical lead screw or worm 16 which operate cooperatively to space the containers evenly for further processing (FIG. 15).

Associated with the capping station C is a container transport system comprising star wheel 18 and guide surface 20 which cooperate to remove the containers from the belt 12 after they have passed through and been spaced by lead screw 16; star wheel 22 which is synchronized with star wheel 18 and guide 24 which remove the containers from star wheel 18 and guide 20 and transport the containers around the capping station maintaining each container with its discharge openings 13 in fixed axial relation to one of the capping spindles S (FIG. 14); and star which 26 which is synchronized with star wheel 22 and which in cooperation with guide surface 28 removes the containers from the capping station and replaces them on belt 12 for transportation through discharge guides 30.

Stationary column 32 (FIG. 4) is fixedly mounted to the base 34 of the machine and carries the various components of the turret 48. The drive gear which comprises worm gear 36 driven by gear and a motor (electric, hydraulic, or air) not shown, drives sleeves 38 and 40 which are fixed, end-to-end, to each other and mounted for rotation on column 32. Sleeve 40 has star wheel 22 or other container holding means such as clamp 21 (FIG. 4) mounted thereon, as well as rotary container spider 42 to support the containers under turret spindles S. The star wheel or other holding means positions the containers with their discharge openings 13 axially aligned under the spindles. Spider 50 is axially mounted and keyed for axial adjustment on sleeve 40, the adjustment being provided by rack 44 on sleeve 40 which cooperates with adjustment worm 46 on spider 50 to provide vertical adjustment for the turret head 48. This adjustment accommodates container runs of varying height. Spider 50, at its hub, supports stationary cam drum 52 on thrust bearing 54, cam drum 52 being axially mounted and keyed to stationary column 32 to permit axial adjustment. Spider 50 is provided with fixed vertical struts 56 which are fixed to and support spider 58 which is axially mounted for rotation and axial movement with spider 50 by bearing 60 on column 32 above cam drum 52. Stationary bull gear 62 is keyed to stationary column 32 to permit axial adjustment. It is supported above spider 58 and on cam drum 52 by the hub of bearing 60.

Spiders 50 and 58 slidably and rotatably mount four spindles S in the illustrated embodiment parallel to and in fixed equal radial relation to stationary shaft 32. Each spindle is mounted for rotation about its own axis and for sliding motion parallel to shaft 32 by upper bearings 64 and lower bearings 66. Rotation is imparted to the elements of the spindle by spindle gear 68 which operatively engages stationary gear 62. Thus as the spiders are rotated by drive gear 36, gear 68 orbits gear 62, is driven thereby and rotates the connected spindle elements about the spindle axis.

Cam followers 70 and 72 are mounted on various elements of spindle S and operatively engage cam tracks 250 and 252 respectively of drum cam 52 providing axial movement to their respectve elements as they orbit the cam drum.

REQUIREMENTS FOR SCREW-ON CAPPING

The application of a screw-on cap such as cap 13s (FIG. 14) to a container requires that a cap be picked up from the screw-on cap feeding mechanism 300 (FIG. 14) by the chuck jaws and be brought into axial alignment with the threaded discharge opening 15 of the container 11, be brought into engagement with the thread of the opening and finally, be screwed onto the thread of the opening to effect closure, after which it is released by the chuck.

REQUIREMENTS FOR ROLL-ON CAPPING

In the case of roll-on capping, a cap blank 13r of displaceable material, such as aluminum, is dropped onto the threaded opening of the container by cap blank feeding mechanism 400 (FIG. 2), the container carrying the cap is brought into alignment with the roll-on chuck. The cap is held in sealing relation against the discharge opening and is held in place against rotation thereon by a nonrotating pad mounted in the chuck. This pressure prevents the cap, and if necessary, the bottle from rotating as threads are rolled into the skirt of the cap blank by the orbiting die rollers (FIG. 26, POSITION 3). After the thread is formed, the chuck is withdrawn to permit removal of the capped container from the machine.

SCREW-ON CAPPING CHUCK

There has been developed a chuck for applying screw-type caps to containers which is extremely rapid in action and highly efficient. This chuck, in association with a turret capper, is disclosed in G. H. Dimond Pat. No. 3,242,-632, issued Mar. 29, 1966. It is a chuck of this type which is used on the instant turret capper for the application of screw-on caps. The chuck will hereinafter be briefly described to indicate the movements which must be applied to it to function properly. More detailed descriptions may be found in the above mentioned Dimond patent and in G. H. Dimond 3,031,882, issued May 1, 1962.

Figure 8:
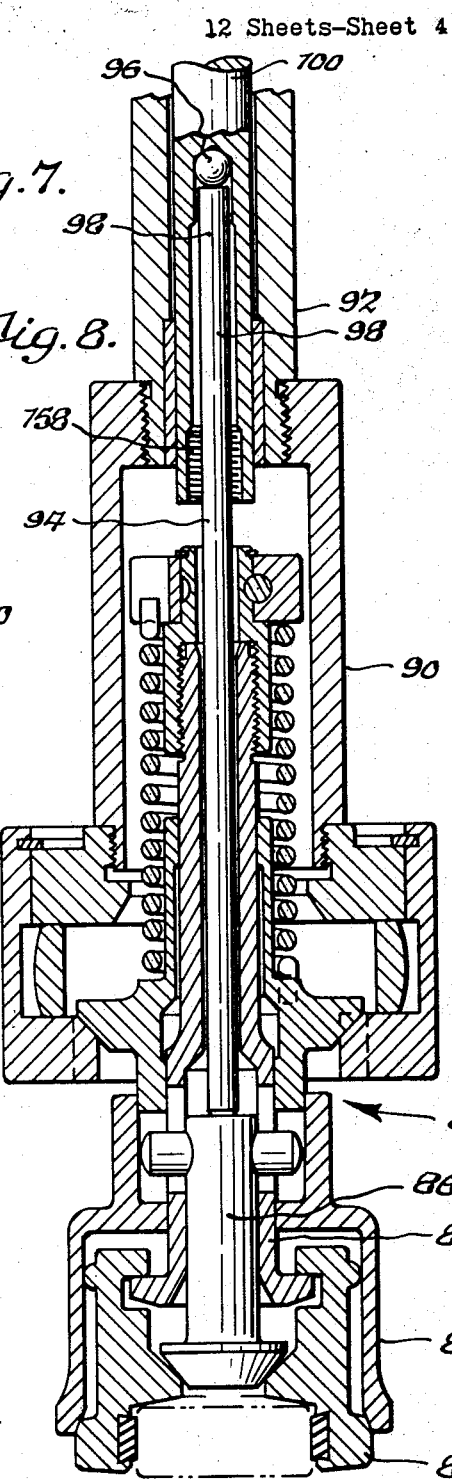
FIG. 8 is a sectional elevation of the screw-on chuck used with the embodiment of FIG. 1 showing portions of the spindle of the instant invention.

The primary elements of the screw-on capping chuck 80 (FIG. 8) are chuck jaws 82, chuck bell 84, the chuck actuator or stripper 86 and sleeve 88. The jaws are retained in the bell by sleeve 88 which is associated with the torque-opening mechanism indicated generally by T and described fully in the above mentioned patents. An adapter sleeve 90 connects the chuck to intermediate spindle sleeve 92 and transmits the rotary motion of spindle sleeve 92 to the chuck through the torque-opening mechanism T.

In operation, the instant invention is capable of imparting rotational and preset programmed vertical motion to the entire chuck assembly. This is done by intermediate spindle sleeve element 92 in a manner to be described. A push rod 94 extends between stripper 86 and ball bearing 96 which is seated at the head of socket 98 of inner spindle element 100. Although the inner spindle element 100 is rotationally restrained in a manner to be described, ball bearing 96 permits push rod 94 to turn with the chuck permitting the preset programmed axial movement of inner spindle element 100 to control the opening and closing of the chuck jaws by operation of the stripper. The chuck jaws are thus opened to receive the cap by pressure of the stripper against the chuck jaws, closed to grip the cap by relaxation of the stripper pressure, and rotated by the intermediate spindle sleeve element to screw-on the cap. Opening of the jaws to release the capped container is accomplished by the torque-opening feature of the screw-on chuck as described in Dimond Pat. No. 3,242,632. However if it is desired to use a screw-on chuck without this feature, the jaws may be opened by action of the stripper initiated by the inner spindle element.

ROLL-ON CAPPING CHUCK

A conventional roll-on chuck 110 (FIGS. 5 and 6) may be used with the turret capper provided with the improvements of the instant invention. The chuck is provided with a presser foot 112 having a recess 114 adapted to hold a cap on its associated container and by the application of pressure thereto, prevent the cap from rotating while threads are being placed in the cap skirt. A first chuck spider 115 is provided which carries a plurality of skirt displacement means such as rolling dies 116 and 118. In the chuck embodiment shown, a roll-on pilfer proof chuck is illustrated. In this chuck, two types of die rollers are provided. Die rollers 116 (FIG. 7) are used to roll the threads into the cap skirt while crimping die roller 118 is used to roll the pilfer proof crimp on the bottom of the skirt. Dies 116 are provided with independent vertical travel capability by springs 120 and roller shafts 122 (FIG. 12) which permits the rollers to follow the thread axially on the container. Die 118 is similarly provided with more limited vertical travel capability to compensate for variations in the height of the pilfer proofing shoulder on the container. The aforementioned movements are independent of the movements of the chuck and are therefore of no significance with respect to the turret capper improvements which constitute the instant invention. As a practical matter a chuck which merely rolls threads or alternatively merely crimps, could be used with no modification of the machine since the machine imparts movements which are common to rolling, crimping, and combination thread rolling and crimping chucks.

Normally, three dies are used with their axis located at the corners of an equilateral triangle thus assuring balanced rolling pressure, radially inward, around the container neck.

The three dies of the instant chuck embodiment are mounted by their respective shafts 122 (FIG. 12) in arms 124 for rotation and yielding axial movement. Since the arms are essentially the same only one will be described. Arm 124 is in turn mounted in chuck spider 115 by pivot pin 126 for radial movement with respect to the chuck axis, being yieldingly held away from the axis by tension spring 128 (FIG. 10). One end of the spring is mounted on the arm by pin 130 and the other end of the spring is mounted near the circumference of the spider by pin 132. The arms are further provided with cam following rollers 134 (FIGS. 5 and 12) which operatively engage sloping cam faces 136 (FIGS. 5 and 13) on chuck cams 138. Chuck cams 138 are pivotally mounted on spider 140 by pins 142 and held yieldingly in place by spring loaded pins 144 which are mounted between spider 140 and spider 141 above and bearing against cam ears 146 which in turn bear against limit stop pins 148 which are mounted on spider 140 below ears 146. Spider 141 is adjustably mounted on the threaded hub of spider 140 to vary the tension on spring loaded pins 144. The operative transverse or radially inward rolling force of the die rollers is therefore limited by the spring loaded pins.

A stud 150 is provided with threaded portions 154 and 156 at either end, presser foot 112 being mounted on the lower end 154, the upper end 156, being received in the threaded portion 158 at the mouth of socket 98 on inner spindle element 100. Thrust bearing 160 is mounted on stud 150 abutting stud shoulder 152. It is located between the stud shoulder and a collar shoulder 162 on collar 164. The collar has a threaded socket 166 on the end opposite the collar shoulder 162 which receives threaded portion 168 of intermediate spindle sleeve 92. Chuck spider 115 is mounted on intermediate sleeve 92, being retained against rotation thereon by key 170 which engages key way 172 on spider 115. Spider 115 is provided with lip 176 which is retained between a second collar shoulder 174 surrounding socket 166 and shoulder 179 on intermediate sleeve 92 above threaded portion 168. Socket 180 on spider 140 receives threaded portion 182 of outside spindle sleeve 184 and is locked thereto by a locking screw 186.

In operation, the roll-on chuck requires that presser foot 112 be restrained from rotation. Spider 115 which moves axially in unison with presser foot 112 must rotate to provide orbital motion to the threading dies. Furthermore, spider 140 must rotate with spider 115 and move axially with respect thereto to force dies 116 and 118 into operative engagement with the cap skirt being displaced. Still further, the entire chuck must move axially with respect to the container discharge opening and the turret head to engage the container being operated upon and release the container when the operation is complete. Portion 188 of pin 126 mounted on spider 115 is received in hole 190 in spider 140. Since it is offset from the axis of the chuck it will cause spider 140 to rotate with 115, that rotation being provided by intermediate sleeve 92 which is coupled, as described above, to spider 115.

CAPPER SPINDLE S

As can be seen from the forgoing description capper spindle S must impart various motions to the particular chuck attached to it. Its ability to provide the desired motions to each chuck without involved adjustments constitutes an advance in the capper art.

A turret capper having the improvements of the instant invention may have one or more spindles mounted on the turret. The instant embodiment discloses a turret mounting four identical equidistant spindles. Since these spindles are identical and are mounted on identical rotating segments of the turret, only one will be described. The use of more than four spindles, to increase the capacity of the capper, may be easily accomplished by merely increasing the diameter of the turret to provide physical space for the extra spindles. It should also be noted that a stationary axis capper utilizing the improvements of the instant invention is possible. In this case containers would move either singly or in groups into fixed capping stations. It would be necessary to rotate a gear similar to bull gear 62 or provide some external source of rotary motion to intermediate spindle sleeve element 92, such as a motor with a flexible connection or other suitable means. A stationary axis capper would also require some means to provide the desired axial movement to the spindle elements, such as a rotating set of cams in place of the stationary cam drum. Similarly, a rotating capper could use other rotational motive means for rotation of the spindle about its axis such as individually mounted motors in place of gears 62 and 68 and cam 52 could be replaced by individual, preset, programmed, linear actuators for each spindle such as electric solenoid, or air, or hydraulic cylinders.

The spindle S, in the case of the disclosed preferred embodiment, is supported for both rotational and axial movement in bearings 64 and 66 which are mounted in head spiders 58 and 50 respectively. The spindle comprises internal spindle element 100, intermediate sleeve element 92 mounted axially thereon for rotational and axial movement and external sleeve element 184 mounted axially on intermediate sleeve 92 for axial and rotational movement, intermediate sleeve 92 being received near its upper end in bearing 64 and external sleeve 184 being received near its lower end in bearing 66. External sleeve 184 is provided with a threaded portion 182 at its bottom end. Cam follower 72 is mounted on the upper end of external sleeve 184 between shoulder 200 and retaining ring 202. Acting in conjunction with its associated cam slot 252 on the cam drum this follower imparts a preset programmed axial motion to the external sleeve element which in turn transmits this motion to spider 140 on the roll-on chuck, as described above. Since sleeve 184 is not utilized in the operation of the screw-on chuck, spider 140 which comprises part of the roll-on chuck, can remain mounted on sleeve 184 while the screw-on chuck is in use, as shown in FIG. 13.

Intermediate sleeve element 92 has a threaded portion 168 at its lower end which extends beyond the lower end of external sleeve element 184. A collar 206 is locked on threaded portion 202 of sleeve element 92 above the outer sleeve element. Spring 208 rests on collar 206 and biases the intermediate sleeve downwardly relative to cam follower 70. The upper end of spring 208 bears against cam follower 70 which is retained on the intermediate spindle sleeve element by retaining ring 210 and locking collar 212. The purpose of spring 208 is to transmit the motion of cam follower 70 to the intermediate spindle sleeve element and in the case of the roll-on chuck, to bias presser foot 112 against the discharge opening of the container while providing for minor variations in container height. Cam follower 70 operating in conjunction with its associated cam track 250 on cam drum 52 provides for a second preset program of axial motion which, in the case of the screw-on chuck, carries the screw-on chuck down onto the cap feeding mechanism 300 (FIG. 14) and then, in the case of both chucks, carries the mounted chuck down into operative engagement with the container opening and finally, after capping is complete, the program provides for raising the mounted chuck from the container to begin a new cycle. A spindle gear 68 is locked onto the top of the intermediate spindle sleeve element and operatively engages stationary bull gear 62. As the spindle orbits the stationary bull gear the spindle gear is caused to rotate and in turn rotates the intermediate spindle sleeve element about the spindle axis. This rotation screws on the screw-on cap and rotates the roller dies in the case of the roll-on caps.

A variable speed drive 214 (FIG. 4) may be used to increase or decrease the relative spindle speed. This unit and its operation is fully described in the aforementioned Dimond Pat. No. 3,242,632.

The bull gear has a cylindrical toothed surface 63 which is of sufficient axial length to provide for operative engagement with the spindle spur gear regardless of the axial movement imparted to the intermediate spindle sleeve element by cam follower 70.

The inner spindle element 100 is provided with socket 98 having internal ball bearing 96 seated at its head and an internally threaded portion 156 at its mouth, the function of which has been described. The inner spindle element passes through the intermediate spindle sleeve element and projects above the spindle spur gear, being provided at its top with bracket 216 (FIG. 7) which is locked between its ends to the inner spindle element with pin 215. One end of bracket 216 extends horizontally to the adjacent fixed vertical strut 56. The bracket end is provided with a fork 217 which permits the bracket to move axially with the inner spindle element but restrains rotation of the bracket in cooperation with strut 56. The bracket 216 in turn restrains rotation of the inner spindle element.

Cam follower 72 (FIG. 7) comprises a cam roller 218 and bracket 222 (FIG. 5). Cam roller 218 is mounted on shaft 220 for operative engagement with its associated cam track 252 on cam drum 52. Shaft 220 is mounted in bracket 222 which mounts between its ends as previously described on the outer spindle sleeve element 184 between collar 200 and retaining ring 202. The bracket is provided at one end with a press fitted sleeve 224 which is adapted to slide on the adjacent vertical strut 56 to provide stabilization for the cam follower 72. This is desirable since the roller is offset from the spindle axis and without such stabilization the spindle would tend to cock and jam. The other end of the cam follower bracket is provided with a hole 226 which receives vertical side rod 228. Rod 228 is provided with spaced adjustable stop nuts 230 and 232' above and below the bracket respectively. The stop nuts function in a manner later described, however once they are set for a particular set of chucks (one roll-on and one screw-on) further adjustment is not needed for the selective use of the two chucks.

Cam follower 70 (FIG. 7) comprises cam roller 234 (FIG. 5) and bracket 238. Cam roller 234 is mounted on shaft 236 for operative engagement with its associated cam track 250 on cam drum 52. Shaft 236 is mounted in bracket 238 which mounts between its ends, as previously described, on the intermediate spindle element 92 between spring 208 and retaining ring 210. The bracket is provided at one end with a bracket sleeve member 240 which is adapted to slide on press fitted sleeve 224 to provide stabilization for the cam follower 70 in the same manner and for the same reason as cam follower 72. The other end of the cam follower bracket is provided with a hole 242 which receives vertical side rod 228.

CAM DRUM

The cam drum 52 is mounted on stationary column 32 as described above. It is provided with cam tracks 250 and 252 which are cooperatively engaged by cam followers 70 and 72 respectively. These tracks provide the necessary preset program of movements through the cam followers and spindle elements to the screw-on and roll-on chucks. FIG. 24 illustrates the course of the cylindrical cam tracks, the tracks being broken at 320 degrees and laid out flat. It will be noted that the upper and lower walls of the tracks are equally spaced by an amount necessary to accept the cam follower rollers, with the exception of track 250 between 53 degrees 30 minutes and 227 degrees 30 minutes. At 53 degrees 30 minutes upper wall 254 and lower wall 256 diverge as shown by track center line 258 which spreads into center lines 258a and 258b. The center line represents the path of travel of the cam follower 70 with 258a representing the path of cam follower 70 when the roll-on chuck is mounted and 258b representing the path of cam follower 70 when the screw-on chuck is mounted.

FIG. 26 shows, proceeding from right to left, the manner in which the cam drum operates the spindle with the roll-on chuck mounted on the spindle. POSITION 1 shows the chuck poised over the container with the cap in place on the discharge opening. POSITION 2 shows the presser foot 112 applying pressure to the cap to establish a sealed relationship between the top of the cap blank 13r and the discharge opening. It will be noted that bracket 222 is abutting stop nut 230. Stop nut 230 acting between POSITION 1 and POSITION 2 holds the cam roller 232 against the upper wall 254 of the cam track causing the cam roller to follow center line 258a, the action being transmitted from stop nut 230 through vertical side rod 228 to bracket 216, to inner spindle element 100, to thrust bearing 160, to intermediate spindle sleeve element 92 and finally to cam follower 70. As the roller proceeds into the lost motion area between 87 degrees and 190 degrees the presser foot 112 is held up by the container and as cam follower 72 recedes from cam follower 70, the stop nut 230 is no longer in abutment with bracket 222, the cam roller 232 being forced to follow the upper cam track wall 250 by transmission of the presser foot pressure by the thrust bearing 160 to intermediate spindle sleeve element 92. If, however, no container were present, the collar 250' adjustably mounted on vertical strut 56 would engage bracket 216 and prevent the presser foot and die rollers from dropping too far down and possibly interfering with the action of the machine. POSITION 3 illustrates the chuck during the thread rolling operation. It can be seen that cam track 252, between POSITION 2 and 3 has forced cam follower 72 downward relative to follower 70 thus closing roller dies 116 and 118 on the cap skirt to effect the roll threading of the cap. POSITION 4 illustrates the roll-on chuck withdrawn to permit the capped container to be discharged from the capping station.

FIG. 27 illustrates the operation of the instant invention with the screw-on chuck mounted on the spindle. POSITION 1 illustrates the screw-on chuck poised over the cap feeding mechanism 300 which is used in the screw-on operation. The cam tracks dip at this point to place the chuck over the cap. Grasping of the cap is accomplished by relative motion between the cam followers 70 and 72. FIG. 25 illustrates diagrammatically the relative displacement of these followers for a portion of their cycle. A cross over in relative spacing occurs between 6 and 10 degrees cam travel (FIG. 25) (POSITION 1 illustrates approximately 5 degrees cam travel) at which point the jaws are about to close on the cap and grip it securely, as the stripper is relieved of pressure from the push rod thus permitting chuck jaw closure. POSITION 2 of FIG. 27 illustrates the screw-on chuck poised over a container discharge opening preparatory to applying the cap. The clearance between push rod 98 and ball bearing 96 should be noted. The inner spindle element withdraws to permit the stripper to rise thus allowing the chuck jaws to close. After the jaws are closed the inner spindle element continues to rise under the influence of cam follower 72 to provide clearance between the push rod and the ball bearing. This clearance provides for the later operation of the torque-open feature previously described.

Also to be noted in POSITIONS 1 and 2 is the function of stop nut 232'. When the roll-on chuck is mounted on the spindle, thrust bearing 160 which mounts on the inner spindle element 100, is in abutting relation to shoulder 162 on the intermediate spindle sleeve element. To achieve this relationship, the inner spindle element must be drawn downward relative to the intermediate spindle sleeve element, thus compressing spring 302 which is mounted on vertical side rod 228 between bracket 238 and bracket 216. Once the spring 302 is compressed and stop nut 232' is seated on bracket 222 the spring no longer functions in the roll-on operation. In this configuration, stop nut 230 functions as described above. When, however, the screw-on chuck is mounted on the spindle, the inner spindle element is axially unrestrained and is free to rise under the influence of spring 302 until stopped by stop nut 232'. In operation, downward movement of cam follower 72 is transmitted from stop nut 232' through vertical side rod 228 to bracket 216 and then to the inner spindle element. Lift is provided to the internal spindle element by spring 302 which causes the internal spindle element to follow the upward axial movement of cam follower 72.

As the spindle moves from POSITION 2 to POSITION 3 the cam roller 232 rides on the lower wall 256 of cam track 250 and thus follows center line 258b (FIG. 24). This results from there being no lifting force from axial pressure by the chuck against the container discharge opening to hold the cam roller against the upper wall of the cam track as in the case of the roll-on operation. POSITION 3 illustrates the chuck as it applies the screw-on cap. A slight drop of the chuck occurs between opening mechanism (see above mentioned U.S. Pat. POSITIONS 2 and 3 as a result of the action of the torque-3,031,822). POSITION 4 illustrates the screw-on chuck as it opens, the torque-opening feature being designed to open when sufficient torque is applied by the cap to the chuck as a result of the cap being fully seated on the discharge opening and, therefore, being incapable of further relative rotation with respect to the container. POSITION 5 illustrates the screw-on chuck in its withdrawn position, the torque-opening mechanism having been reset as a result of downward relative motion between the stripper element and the inner spindle element which closes the clearance between the inner spindle element and the push rod and causes the push rod to push the stripper against the jaws an amount sufficient to reset the chuck.

Figure 2:
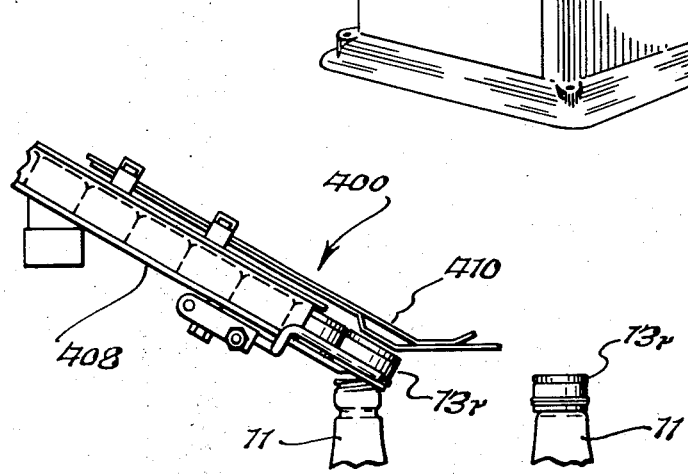
FIG. 2 is an elevation of a fragment of the roll-on cap feeding mechanism used with the preferred embodiment of the instant invention.
Figure 3:
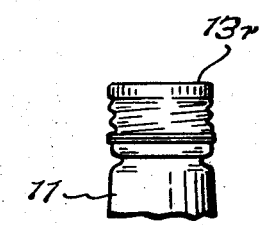
FIG. 3 is a fragmentary view of a container discharge opening capped with a roll-on pilfer-proof cap.

The procedure for applying caps to the container discharge opening requires, in the case of screw-on caps, that the cap be fed to the screw-on capping chuck, while in the case of the roll-on caps, that the cap blanks be fed directly to the container discharge openings of the containers. Cap feeding mechanism B comprises any conventional cap sorter-feeder system 402 mounted above input station A on base mounted column 404 which takes caps from hopper 406 and feeds the caps down chute 408, the caps being oriented in the upright position. Chute mouth 410 resiliently retains the caps at an angle with a portion of the cap skirt depending below the chute mouth to permit pick-up by the screw-on cap feed mechanism in the case of screw-on operation and the container discharge opening in the case of the roll-on operation. In the case of the roll-on operation FIG. 2 illustrates the container 11 in the process of removing roll-on cap blank 13r from mouth 410 of the cap chute 408. In the case of the screw-on operation FIGS. 14 and 15 illustrate the screw-on caps 13s being removed from chute mouth 410 of chute 408 by screw-on cap feeder 300. Screw-on cap feeder 300 comprises feeder wheel 302 which is mounted for rotation with star wheel 18 on shaft 304. Feeder wheel 302 is provided with cap receiving fingers 306 which pass beneath the chute mouth and are adapted to remove caps from the mouth and carry the caps around into position under the screw-on chucks for pick-up by the chucks. A stationary cam 308 is provided to urge the fingers into the raised pick-up position as they approach the chute mouth and to permit the fingers to withdraw upon grasping of the cap by the screw-on chuck. Wheel 302 and cam 308 are mounted for the screw-on operation but are removed for the roll-on operation.

It should be noted that the various star wheels employed in the container transport system of the instant invention are shaped specifically for the particular containers being capped and are normally changed for each run of different containers.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. Apparatus for selectively capping with both screw-on and roll-on containers having a discharge opening provided with cooperative cap engagement means, said screw-on caps comprising a screw-on cap top and a depending internally threaded skirt, said roll-on caps comprising a roll-on cap top and a depending displaceable skirt, said apparatus comprising:
 (I) container stabilization means to
   (A) hold said container in an upright position
   (B) control rotation of said container during capping
 (II) first chuck means having a first axis of rotation for applying said screw-on cap comprising
   (A) jaw means axially aligned with said first axis to
     (1) grip and retain said screw-on cap (2) move said screw-on cap axially into initial engagement with said cooperative cap engagement means
(3) rotate said screw-on cap to complete engagement of said threaded skirt with said cooperative cap engagement means
(B) stripper means
  (1) which
    (a) are coaxial with said jaw means
    (b) operably engage said jaw means
    (c) are axially moveable relative to said jaw means
  (2) to open and close said jaw means
(C) stripper coupling means for transmitting rotation of said jaw means to said stripper means
(III) second chuck means having a second axis of rotation for forming engagement means in said displaceable roll-on cap skirt comprising
  (A) presser foot means
    (1) which
      (a) are coaxial with said second axis means
      (b) are adapted for stabilization against rotation relative to said container discharge opening
    (2) for
      (a) urging said roll-on cap top into sealing relation with said discharge opening by axial movement of said presser foot means relative to said discharge opening
      (b) stabilizing said roll-on cap against rotation relative to said discharge opening
  (B) displacement means
    (1) which
      (a) are coaxial with said presser foot means
      (b) are radially spaced from said presser foot means
      (c) are radially inwardly moveable into operative engagement with said displaceable skirt of said roll-on cap
      (d) are rotatable about said discharge opening
    (2) for radial inward and rotationally progressive displacement of said displaceable skirt for cooperative engagement of said skirt with said cooperative cap engagement means
  (C) displacement actuating means
    (1) which
      (a) are axially aligned with said displacement means
      (b) cooperatively engage said displacement means
      (c) are moveable axially with respect to said displacement means
    (2) for operative axial movement relative to said displacement means to urge said displacement means against said displaceable skit
(IV) spindle means
  (A) which
    (1) are spaced above said container discharge opening
    (2) have a common axis of rotation with said container discharge opening
  (B) for selective axial attachment thereto and operation of
    (1) said first chuck means
    (2) said second chuck means
  (C) comprising
    (1) an inner spindle element which
      (a) is axially aligned with said spindle axis
      (b) is adapted for stabilization against rotation relative to said container discharge outlet
      (c) is axially moveable with respect to said spindle means
    (2) an intermediate spindle sleeve element which
      (a) is coaxially mounted on said inner spindle element
      (b) is rotatable relative to said spindle means
      (c) is axially moveable relative to said spindle means
    (3) an outer spindle sleeve element which
      (a) is coaxially mounted on said intermediate spindle sleeve element
      (b) is axially moveable relative to said spindle means
(V) spindle stabilization means
  (A) which operably engages said inner spindle element
  (B) for stabilizing said inner spindle element against rotation relative to said container discharge opening
(VI) rotational means
  (A) which operably engages said intermediate sleeve element
  (B) for rotating said intermediate spindle sleeve element about said common axis relative to said container discharge outlet
(VII) first axial movement means
  (A) which operatively engages said intermediate spindle sleeve element
  (B) for imparting axial movement to said intermediate spindle element
(VIII) second axial movement means
  (A) which
    (1) operatively engages said outer spindle sleeve element
    (2) selectively operably engages said inner spindle element for applying said screw-on caps
  (B) for
    (1) imparting axial movement to said outer spindle sleeve element
(IX) inner spindle element coupling means
  (A) which selectively operably engages
    (1) said stripper means
    (2) said presser foot means
  (B) for selectively
    (1) imparting the axial motion of said second axial movement means to said stripper means
    (2) stabilizing said presser foot means against rotation relative to said container discharge opening
(X) intermediate spindle sleeve element coupling means
  (A) which selectively operably engages
    (1) said jaw means
    (2) said displacement means
  (B) for selectively imparting said rotational movement relative to said container discharge opening to said
    (1) jaw means
    (2) displacement means
(XI) outer spindle sleeve element coupling means
  (A) which operatively engages said displacement actuating means
  (B) for imparting the axial motion of said second axial movement means to said displacement actuating means (XII) first preset program means which
  (A) operatively engages said first axial movement means
  (B) comprising a preset program of axial motion to selectively move into operative engagement with said container
    (1) said screw-on chuck
    (2) said roll-on chuck
(XIII) second preset program means which
  (A) operatively engages said second axial movement means
  (B) comprises a preset program of axial motion to selectively provide said axial movement of
    (1) the stripper means relative to the jaw means
    (2) the displacement actuating means relative to said displacement means
  (C) is sequentially synchronized with said first preset program means.

References Cited

UNITED STATES PATENTS 2,359,932  10/1944  Newey _____ 53—201
3,040,492  6/1962  Stover et al. _____ 53—201 X TRAVIS C. McGEHEE, Primary Examiner U.S. Cl. X.R.

53—317, 334